United States Patent [19]

Solomon

[11] Patent Number: 4,552,656

[45] Date of Patent: Nov. 12, 1985

[54] PURIFIED WATER STORAGE SYSTEM

[75] Inventor: Donald F. Solomon, Newport Beach, Calif.

[73] Assignee: Wetco, Inc., Las Vegas, Nev.

[21] Appl. No.: 534,983

[22] Filed: Sep. 23, 1983

[51] Int. Cl.⁴ ............................................. B01D 13/00
[52] U.S. Cl. ................................ 210/137; 210/257.2; 210/258
[58] Field of Search ...................... 210/137, 143, 257.1, 210/257.2, 256, 258, 262, 321.1, 416.1

[56] References Cited

U.S. PATENT DOCUMENTS

| | | | |
|---|---|---|---|
| 3,365,061 | 1/1968 | Bray | 210/137 |
| 3,493,496 | 2/1970 | Bray et al. | 210/257.2 |
| 3,670,890 | 6/1972 | Hall, Jr. et al. | 210/137 |
| 3,679,055 | 7/1972 | Clark et al. | 210/257.2 |
| 3,688,911 | 9/1972 | Baerg | 210/104 |
| 3,719,593 | 3/1973 | Astil | 210/258 |
| 3,746,640 | 7/1973 | Bray | 210/637 |
| 3,831,757 | 8/1974 | Gossett et al. | 210/257.2 |
| 4,014,792 | 3/1977 | Gossett et al. | 210/257.2 |
| 4,021,343 | 5/1977 | Tyler | 210/257.2 |
| 4,086,166 | 4/1978 | Martin | 210/257.2 |
| 4,190,537 | 2/1980 | Tondreau et al. | 210/98 |

Primary Examiner—Peter Hruskoci
Attorney, Agent, or Firm—Seiler, Quirk & Tratos

[57] ABSTRACT

A purified water storage system for a reverse osmosis purification unit has a container containing an interior chamber defined in part by a flexible wall member, such as a bladder or diaphragm, for receiving and containing purified water. A second chamber for containing pressurized air exists on the opposite side of the flexible wall member. The second chamber is at least 75%, preferably 80%, and still more preferably 100% of the maximum volume of the water-containing chamber.

16 Claims, 4 Drawing Figures

PURIFIED WATER STORAGE SYSTEM

BACKGROUND OF THE INVENTION

This invention relates to the storage system for water purified by reverse osmosis. More particularly, the invention relates to a bladder containing a purified water tank having a chamber exterior of the bladder for retaining a pressurized fluid, preferably air. The volume of the chamber exterior to the bladder is approximately equal to the volume of the bladder when the bladder is full.

The process of purifying hard or brackish water by reverse osmosis is well known and is in wide commercial usage. Typically, brackish water under pressure is passed over a thin reverse osmosis membrane, commonly made from cellulose acetate; water passes through the membrane and the majority of impurities are rejected at the surface and swept away. Water passing through the membrane is collected in a storage tank for use upon demand. Most commercial units are relatively small, being used primarily to provide drinking water in areas where municipal or well water contains large quantities of salts or impurities. Generally, these units are limited in capacity to a few gallons per day. Since the passage of water through the membrane is a very slow process, the purified water is made continuously and is stored in a tank until needed. The most common method of storing water is in a bladder tank, wherein the purified water passes from the reverse osmosis cartridge directly to the interior of a flexible bladder which is contained in a pressure tank. In order to maintain a driving force to move the purified water out of the tank to a purified water faucet upon demand, the interior of the tank outside of the bladder is generally pressurized with about 5 psi of air. Accordingly, as the bladder fills with purified water, the bladder expands within the tank and the pressure within the tank increases gradually from 5 psig to the line pressure upstream of the reverse osmosis unit. When the bladder is full, the pressure in the bladder equals line pressure, and flow through the reverse osmosis membrane stops since there is no pressure drop across the membrane.

Two undesirable events occur as the bladder fills and the pressure drop across the membrane decreases. First, the volume of flow through the membrane is directly related to the pressure drop across the membrane. Therefore, as the pressure drop decreases, the volume of flow through the membrane decreases substantially. More importantly, however, it has been found that the efficiency of a reverse osmosis membrane, particularly a cellulose acetate membrane, is very highly dependent on the pressure drop across the membrane. For example, it has been found that at a pressure drop across a cellulose acetate membrane of about 25 psi, nearly 90% of the salts are rejected by the membrane. At a pressure drop of 10 psi across the membrane, however, only about a 60% rejection can be expected.

Accordingly, as the bladder fills from an entirely empty state, the pressure drop across the membrane will decrease from an initial pressure drop equal to line pressure minus tank pressure (i.e., line pressure—5 psi), to zero. Since the pressure drop is large when the tank is empty, water made as the tank is just beginning to fill can be expected to have a high degree of purity. When the pressure drop declines to below approximately 25 psi, the quality of water passing the membrane becomes increasingly poor. In actual usage, this problem becomes particularly aggravated by the habits of most users to draw relatively small quantities of water from the tank at a time. For example, if a tank has filled to its capacity (e.g., 3 gallons) overnight, and a user draws off a glass of water to drink, the withdrawal of the glass of water may only generate a pressure drop of a few psi across the membrane. Repeated daily withdrawals of relatively small quantities of water means that the membrane will be continually operating at a relatively low pressure drop, resulting in the continuous manufacture of water of relatively poor quality.

Accordingly, it is an object of the invention to provide a system for containing reverse osmosis water such that withdrawals of relatively small amounts of water, even from a full system, generate a substantial pressure drop across the reverse osmosis membrane. It is another object of the invention to provide a water storage system which enables the maintenance of a substantial pressure drop across the membrane, and which is easy to maintain and does not have a substantial number of working parts. It is a still further object of the invention to provide such a system which is relatively inexpensive, simple to install, and easy to maintain. These and other objects of the invention are accomplished by the use of the reverse osmosis water supply system as described herein.

SUMMARY OF THE INVENTION

The invention comprises a reverse osmosis water storage system having a tank containing a bladder which is filled with fluid, preferably purified water. The system is constructed such that when the bladder is filled to maximum capacity, a volume of pressurized air approximately equal to the bladder volume exists in the chamber exterior of the full bladder. Accordingly, the system comprises a first walled chamber containing the bladder, and a second walled chamber for containing pressurized air, and at least one passageway operatively connecting the two chambers. The two chambers are preferably approximately equal in size. The second air-containing chamber may be maintained within the same vessel as the bladder, or may be contained in one or more vessels which are connected by a conduit.

BRIEF DESCRIPTION OF THE DRAWINGS

The invention is best understood with reference to the drawings, in which.

DETAILED DESCRIPTION OF PREFERRED EMBODIMENTS

Figure 1:
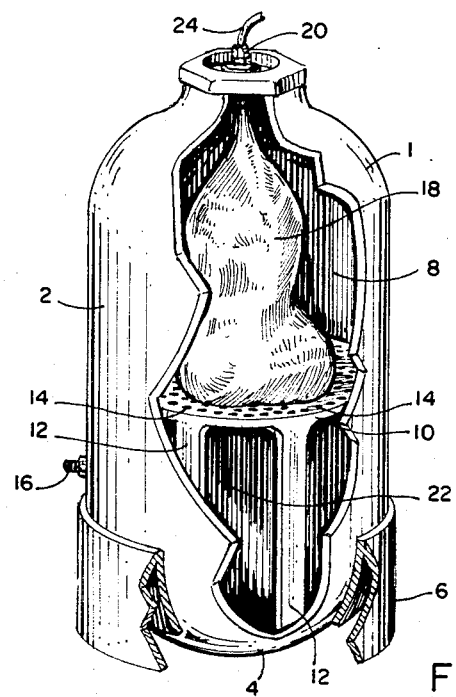
FIG. 1 is a system of the invention in which the bladder and the air chamber are contained within the same vessel.

Referring first to FIG. 1, conventional fiberglass tank 1 is a generally cylindrical pressure vessel mounted on a support stand 6. The vessel has side walls 2 and a bottom wall 4 and is enclosed at the top by a threaded fitting, best seen in FIG. 3. The interior of the tank is hollow and is divided into an upper chamber 8 and a lower chamber 22 by a platform 10. The platform is supported at approximately the mid-point of the vessel interior by a plurality of legs 12. The platform has a plurality of perforations or small holes 14 which extend through the entire thickness of the platform and serve as passageways for air to pass freely between the upper and lower chambers. The upper chamber 8 contains a flexible bladder 18 of the conventional type to hold purified water. The bladder is operatively connected to purified water inlet line 24 at the top of the vessel. A conventional air pressurization valve 16 is mounted in the vessel wall and is used to pressurize the interior of the tank. The valve may be located in the vessel cap or sidewall, or in the second air vessel shown in FIG. 2. The location of the valve is immaterial, as long as it communicates with the interior air chamber.

Figure 2:
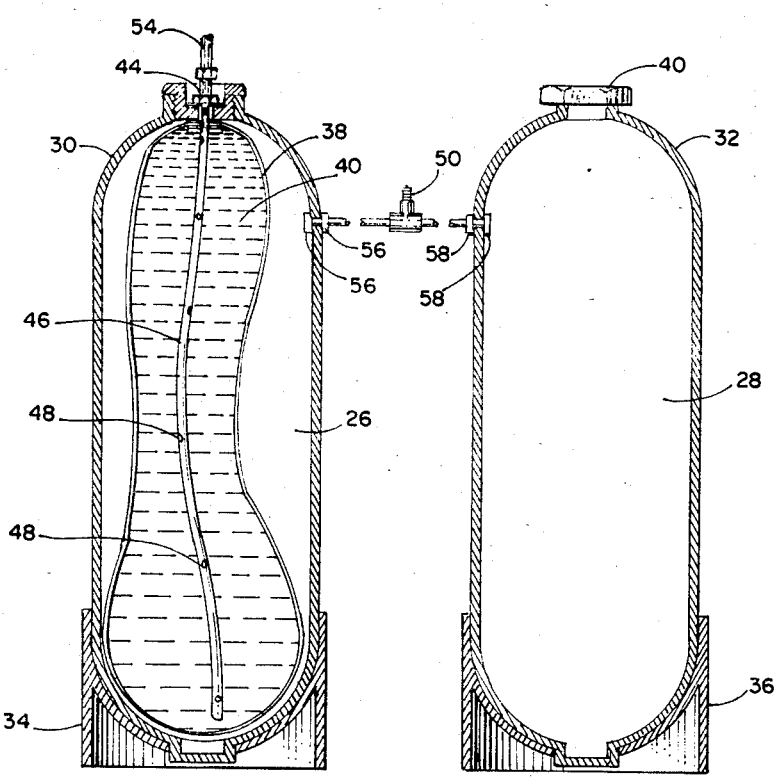
FIG. 2 is a system of the invention wherein the air chamber is maintained in a separate vessel from the bladder, and the two vessels are connected by tubing.

In the assembly shown in FIG. 1, both the chamber containing the bladder and the second chamber containing air are housed in the same vessel. An alternate embodiment is shown in FIG. 2, in which the air chamber is partially contained in a separate vessel which is connected by a conduit. As shown in FIG. 2, the system consists of a first vessel 30 having a bladder 38 contained in the interior chamber 26 of the vessel, and a second vessel 32 which encloses an empty interior chamber 28. The two tanks are mounted in upright position by support stands 34 and 36. In the embodiment shown in FIG. 2, bladder 38 is filled with water 40; however, if desired, the purified water may be fed to the tank exterior of the bladder, and the pressurized air can be put inside the bladder with effective results. Both tanks are maintained in fluid-tight condition, with a threaded cap 42 sealing vessel 32, and a fitting assembly 44 (best seen in FIG. 3) enclosing vessel 30.

A conduit 52 which consists of a length of flexible copper tubing extends between the two vessels 30 and 32. The conduit communicates with the interior of each vessel, and is sealingly fastened thereto by fittings 56 and 58. An air pressurization valve 50, of a type used to pressurize vehicle tires, is mounted in the line.

Of particular importance is a tube, which may be flexible or rigid, 46 which extends downwardly from the purified inlet tube 54 into the bladder. The tube has a series of perforations 48 extending along its length and communicating with the interior of the tube. The tube is flexible, and extends nearly to the bottom of the bladder. One purpose of this tube is to eliminate any problem which may be caused by uneven collapsing of the bladder as water is withdrawn therefrom. For example, if the pressure in the vessel exterior of the bladder caused the bladder to collapse unevenly, one or more pockets of water could become trapped at another portion of the bladder and could not escape through the outlet. The perforations in the tube minimize the possibility of having any water trapped within the bladder. In addition, small quantities of air which may be dissolved in feed water pass through the reverse osmosis membrane and into the storage tank. Accordingly, in an upright storage tank, the air tends to accumulate at the top of the tank above the water. If the air is not permitted to escape, it will continue to accumulate in the tank and will decrease the volume available in the bladder for holding purified water. With the perforated tube, air at the top of the tank will immediately exit into the tube as soon as the demand valve is opened downstream of the storage tank. Accordingly, in this manner the accumulation of air within the tank is precluded.

To ensure that air in the exterior of the bladder chamber can circulate freely around the bladder, it may be desirable to serrate the interior surface of the chamber walls, or, even more preferably, to line the interior walls with fabric (e.g., by securing the fabric to the wall with glue). In this manner, even if the bladder is pressed against the tank wall, air can circulate through the fabric interstices.

Figure 3:
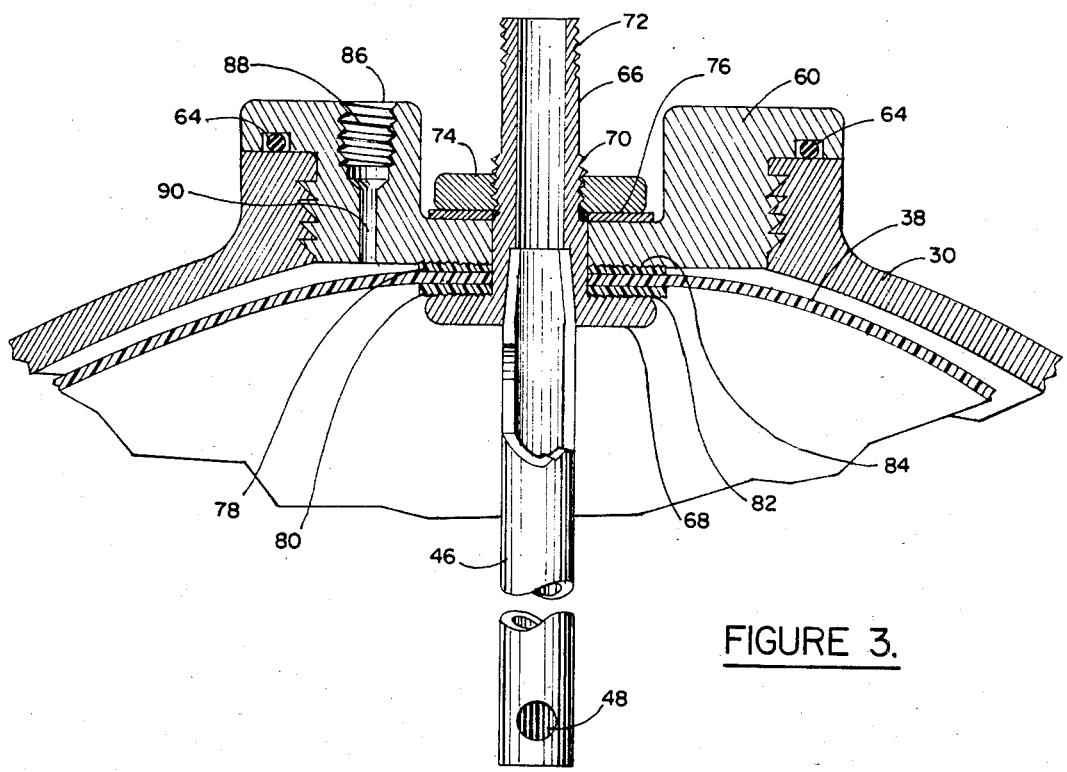
FIG. 3 is a sectioned partial view of a top portion of the bladder tank.

The fitting at the top of the bladder tank is shown in FIG. 3. The tank 30 is enclosed by a cap 60 which has threaded engagement with the tank at 62. A concentric O-ring 64 provides a pressure tight seal for the cap. A discharge nipple 66 extends through a bore in the center of the cap and has a circular radial flange 68 on the bottom end thereof. The nipple is fastened in place by a lock nut 74 which engages threads 70 on the central exterior of the nipple. A washer 76 mounts between the lock nut and the cap.

The bladder 38 is fastened into place at the top of the tank and is mounted between two flexible rubber buffers or washers 78 and 80. These washers are made from the same material as the bladder and are squeezed on either side of the bladder to make a pressure-tight seal and to avoid damage to the bladder. The upper surface 82 of the flange and the lower surface 84 of the interior of the cap are roughened or serrated to assure that a non-slip seal can be maintained. The bladder washers are cinched to a pressuretight fit by the lock nut 74. A pressurization port 86 is located on one side of the cap. The port consists of a threaded valve receiver bore 88 and a conduit 90 which extends into the interior of the vessel. As shown in FIG. 3, the perforated tube 46 is press fit into the rear portion of the nipple, and forms a portion of the conduit by which purified water passes into and out from the vessel.

While the embodiment shown in the drawings shows a bladder attached to the tank at its top, the invention works equally well with a conventional diaphragm tank, i.e., where the bladder is attached to the interior tank peripheral wall as a diaphragm. Where a diaphragm tank is used, it is generally not necessary to use the perforated tube shown in FIG. 3.

The key to operation of the system of the invention is having a substantial volume of pressurized air outside of the bladder when the bladder is full to maximum capacity. As seen in FIG. 1, when the bladder fills the entire volume of upper chamber 8, the entire volume of lower chamber 22 is filled with pressurized air. Since air can flow freely between the chambers, pressure in both chambers is the same. The same situation exists in the system of FIG. 2, the only difference being that the air chamber is substantially maintained in a separate vessel, with communication being established between the two vessels through unobstructed tube 52. The air chamber is preferably at least 75%, and more preferably 80%, and still more preferably about 100% of the volume of the bladder chamber. The reason for the importance of the size of the air chamber is dramatically illustrated in the graph of FIG. 4. The upper curve in the drawing shows the efficiency of the membrane, measured as the percentage of rejection of impurities in the feed water to the reverse osmosis unit, as a function of pressure drop across the membrane. The graph is prepared for a system in which the air chamber is initially pressurized to a pressure of 5 psig to assure sufficient driving force to empty the tank upon demand. As is apparent from the graph, the efficiency of the membrane drops off drastically as the pressure drop across the membrane decreases below about 20 psi. At 25 psi pressure drop, salt rejection is about 87.5%, which is a very acceptable performance. At higher pressure drops, the membrane efficiency generally flattens out to a performance level of slightly over 90%. Below 20–25 lbs., the membrane performance falls off rapidly.

Figure 4:
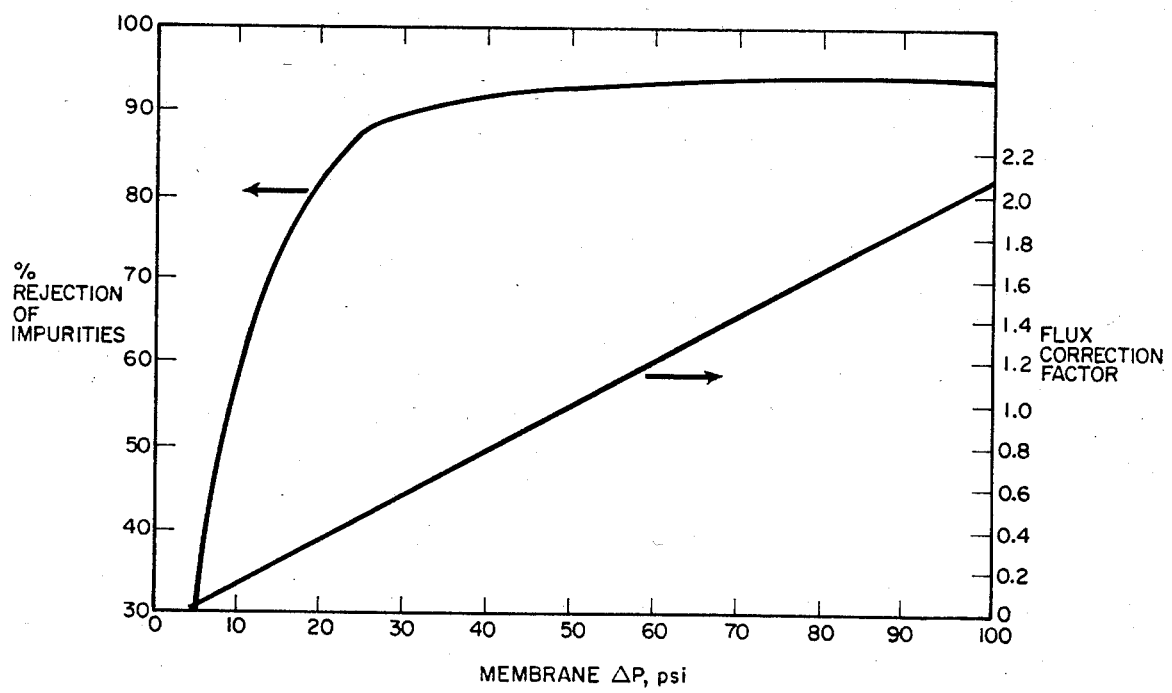
FIG. 4 is a graph showing the effect of membrane pressure drop on membrane efficiency and throughput (flux).

The right-hand curve on the graph of FIG. 4 shows the flux correction factor, which is a multiplier for flow volume through a given water purification unit depending on the pressure drop across the unit. A flux correction factor of 1.0 is defined as the module flow rating at an absolute pressure drop of 50 psi. As is apparent from the graph, as the pressure drop decreases, the flow through the module decreases at a very rapid rate. Accordingly, the benefits to operating at membrane pressure drops in excess of 20–25 psi are readily apparent.

The information set forth in the graph translates into practical application as follows. If the volume of the bladder chamber and the volume of the air chamber surrounding the bladder are equal, and the air chamber is filled initially with 5 psig of air pressure, when the bladder is entirely filled with water the pressure in the air chamber will be approximately 24 psig. Accordingly, the pressure drop across the membrane will be equal to line pressure minus 24 psig. For example, if the line pressure is 50 psig, the pressure drop across the membrane will be 26 psi. Since most line pressures in municipal water supplies are at least 50 psi, the pressure drop across the membrane will exceed about 25 psi during the entire operation of the membrane except for a very momentary period after the bladder tank is full when the pressure will increase almost immediately from 24 psig to line pressure (as the system reaches a static condition). Similarly, when the valve is opened to demand water from the storage tank, the pressure in the system immediately drops from line pressure to 24 psi. Accordingly, there is a very short period of time when the pressure drop across the membrane is low, and poor quality water is made.

The foregoing detailed description of preferred embodiments is to be understood as illustrative only, and should not be considered as limiting the invention. Those skilled in the art will recognize the many modifications and changes that may be made to the preferred embodiments, and still remain within the spirit and scope of the invention. Accordingly, the invention should be considered limited only by the following claims.

I claim:

1. A purified water container system comprises
   a container having rigid walls capable of holding a fluid under pressure,
   a first chamber within said container,
   a flexible impermeable bladder mounted within said first chamber,
   walls means in the container for precluding expansion of the bladder beyond a predetermined volume,
   a second chamber having a volume of at least 75% of the volume of the first chamber,
   at least one passageway connecting said first chamber with said second chamber,
   conduit means for passing purified water from a reverse osmosis purification unit into and out from the bladder under pressure to said bladder, and
   supply means for providing a gas under pressure to said chambers, said system being constructed such that when the bladder is filled to the maximum capacity, a volume of pressurized gas approximately equal to at least 75% of the bladder volume exists in said second chamber to enable the maintenance of a substantial pressure drop across said reverse osmosis unit.

2. The system of claim 1 wherein the second chamber is inside said container.

3. The system of claim 1 also comprising a second walled container, wherein the second chamber is inside said second container.

4. The system of claim 3 wherein said two containers are connected by a conduit.

5. The system of claim 1 also comprising means to permit flow of gas around the entire exterior of the bladder when the bladder is fully inflated.

6. The system of claim 1 wherein volume of the second chamber is at least about 80% of the volume of the first chamber.

7. The system of claim 1 wherein volume of the second chamber is at least about 100% of the volume of the first chamber.

8. The system of claim 1 wherein the bladder is filled with water, and the second chamber is filled with pressurized air.

9. The system of claim 1 also comprising removable closure means for sealingly enclosing said container, conduit means through said closure means communicating with the interior of the bladder and an elongate tube having a plurality of longitudinal bores therein communicating with the conduit means.

10. A purified-water container system comprising
    a container having rigid walls capable of holding a fluid under pressure,
    a first expandable and contractable chamber within said container for containing purified water, said chamber being defined by at least one flexible wall,
    conduit means for passing purified water from a reverse osmosis unit into and out from the first chamber,
    a second chamber for containing gas under pressure, said second chamber also being defined in part by said flexible wall, supply means for providing a gas under pressure to said second chamber, and
    said second chamber having a minimum volume of at least 75% of the maximum volume of the first chamber, said system being constructed such that when the first chamber is filled to the maximum capacity, a volume of pressurized gas approximately equal to at least 75% of the first chamber exists in said second chamber to enable the maintenance of a substantial pressure drop across said reverse osmosis unit.

11. The system of claim 10 wherein the second chamber has a minimum volume of at least 80% of the maximum volume of the first chamber.

12. The system of claim 10 wherein the second chamber has a minimum volume of at least 100% of the maximum volume of the first chamber.

13. The system of claim 10 wherein the flexible wall comprises a thin, impermeable membrane.

14. The system of claim 10 wherein the membrane is a bladder.

15. The system of claim 10 wherein the membrane is a diaphragm.

16. The system of claim 10 also comprising an elongate tube communicating with the conduit means and having a plurality of longitudinal bores therein.

* * * * *